United States Patent [19]

Zenbayashi et al.

[11] 4,350,548
[45] Sep. 21, 1982

[54] METHOD AND APPARATUS FOR PROVIDING THE INNER SURFACE OF A PIPE LINE WITH A LINING

[75] Inventors: Katsuaki Zenbayashi; Akio Morinaga, both of Fujisawa; Masao Hirayama; Akira Morita, both of Settsu, all of Japan

[73] Assignees: Tokyo Gas Co., Ltd., Tokyo; Ashimori Industry, Co., Ltd., Osaka, both of Japan

[21] Appl. No.: 234,861

[22] Filed: Feb. 13, 1981

[30] Foreign Application Priority Data

Feb. 18, 1980 [JP] Japan .................................. 55-19569

[51] Int. Cl.³ .............................................. B32B 31/20
[52] U.S. Cl. ................................... 156/156; 138/124; 138/141; 138/177; 156/94; 156/287; 156/294; 156/295; 156/423; 156/497; 156/499; 264/36; 264/516; 264/573; 285/15; 285/45; 405/150
[58] Field of Search .................. 156/94, 156, 287, 294, 156/295, 423, 497, 499; 138/123, 177, 124, 140, 141; 405/150; 264/516, 573, 36; 285/15, 45

[56] References Cited

U.S. PATENT DOCUMENTS

| | | | |
|---|---|---|---|
| 3,294,607 | 12/1966 | Rothermel et al. | 156/287 X |
| 3,758,361 | 9/1973 | Hunter | 156/287 |
| 3,927,164 | 12/1975 | Shimabukuro | 156/294 X |
| 4,064,211 | 12/1977 | Wood | 156/287 X |
| 4,182,262 | 1/1980 | Everson et al. | 156/294 X |
| 4,273,605 | 6/1981 | Ross | 156/294 X |

*Primary Examiner*—Edward C. Kimlin
*Assistant Examiner*—Robert A. Dawson
*Attorney, Agent, or Firm*—Birch, Stewart, Kolasch & Birch

[57] ABSTRACT

A method and apparatus for causing a flexible tubular lining material to be fixed to the inner surface of a pipe line wherein the tubular lining material is initially attached to the inner surface of the pipe line by a binder provided on the surface of the tubular lining material which comprises providing a flexible hose material having a porous structure inside the pipe line which has been lined with the tubular lining material and introducing a heated gaseous fluid stream into the interior of the flexible hose whereby the heated gaseous fluid stream is introduced through the pores of the flexible hose along the inner surface of the lined pipe line, the flexible tubular lining material being warmed to accelerate the curing of the binder interposed between the inner surface of the pipe line and the flexible lining material.

14 Claims, 7 Drawing Figures

METHOD AND APPARATUS FOR PROVIDING THE INNER SURFACE OF A PIPE LINE WITH A LINING

BACKGROUND AND SUMMARY OF THE INVENTION

The present invention relates to a method for providing the inner surface of pipe lines, chiefly those already laid under the ground, for example, such as gas conduits, city water pipes and pipes enclosing power transmission wires or telephone cables, with a lining with a view toward reinforcing the pipe lines or repairing damaged portions thereof. More particularly, the present invention is directed to a method for providing the inner surface of a pipe line with a flexible lining material by turning a tubular lining material inside out through the action of a pressurized fluid, wherein the inner surface of the pipe line containing the flexible lining material is heated with a gaseous fluid ejected through pores formed in a tube which is introduced into the interior of the pipe line.

When a pipe line as described above is provided with a lining, it has been the practice to apply a flexible lining material onto the inner surface of the pipe line by means of a binder. In this case, since the lining material is to be attached together with an air-tight pipe, a binder containing a volatile component cannot be used. For this reason, two-component, reaction curing type binders, such as epoxy resin binders, are generally utilized. However, when using such binders, they should not start to harden in the course of the lining operation, so that binders with a fairly long pot life have to be utilized, thereby taking into account the time required from their preparation, to completion of evagination and insertion of the lining material. On the other hand, the longer the pot life of a binder, the longer is its curing time in approximately equal proportion thereto. Therefore, using such binders, the bonding between the lining material and the inner surface of the pipe line will takes a longer time.

It is known that warming an adhesive, a binding agent, accelerates its hardening, thus reducing its curing time. For instance, when a binder having a pot life of 3 hours at 20° C. is warmed up to 60° C., it starts to harden within about 10-20 minutes and its hardening can be nearly completed within about 30 minutes to 1 hour. Accordingly, if the pipe line could be adequately warmed over its full length, the hardening of the binder could be accelerated leading to a reduction in the time required for lining the pipe, which is very desirable. However, it is extremely difficult to uniformly warm an underground pipe line over its entire length, extending sometimes for several hundred meters. Though it is a common practice to warm the binder by introducing a heating medium into the lining material which is firmly attached to the inner surface of the pipe line, there is no available heating medium which is completely suitable for this purpose. For example, even if a hot blast of a gas is introduced into the pipe, the treatment has to be continued for a long period of time, e.g. hours, in order to warm the pipe line over its entire length because of the small heat capacity of the hot blast. This approach is almost impossible and thus impractical. Moreover, while direct introduction of pressurized steam is also conceivable, it remains extremely difficult to control temperature of the steam. Thus a temperature of the steam of 100° C. or higher around the inlet of the pipe can subject the lining material to the effects of moisture as well as heat which may result in the eventual intense deterioration of the lining material. In addition, although warm water may also be introduced into the pipe, a large quantity of water would be required for uniformly warming a long section of pipe line. Also, it would not be easy to drain this large quantity of water which is introduced after the hardening of the adhesive agent.

Another approach has been to incorporate an electroconductive heating element in the pipe line itself or the lining material. However, this method not only is expensive but also requires the heating element to be incorporated at the time of laying the pipe line. Also this is not feasible with respect to a pipe line that is already buried. In any event, once the conductive heating element has broken down within the pipe line, this method can no longer be utilized.

No pertinent prior art is known for internally warming a lining material applied to the inner surface of a pipe line to accelerate the curing of a resinous binder to thereby shorten the time required for lining a pipe line. U.S. Pat. No. 4,064,211 shows in column 4, lines 2-6, the use of a circulation pipe 46 for controlling the temperature of water contained within a lining tube. This patent appears to suggest heating a lining material internally with hot water introduced into the tube. According to the method disclosed in this patent, however, that portion of the tube near one end of the pipe line through which the hot water has been introduced experiences localized overheating and the temperature drops as the distance from this end becomes larger. As an additional disadvantage, a large amount of hot water and a large heat source are required for conducting this method. Thus, expensive facilities are necessary in this method if an outdoor operation is carried out, for example, for lining underground pipe lines.

Accordingly, an object of the present invention is to provide a method for effectively lining pipe lines, particularly underground pipe line;

Another object of the present invention is to provide a method and apparatus for accelerating the hardening of a binder by adequately and uniformly warming a pipe line over its entire length;

A further object of the present invention is to provide a method and apparatus for shortening the time required for lining pipe lines;

Still another object of the present invention is to provide a means for internally and uniformly heating the lining material of a pipe line;

Yet another object of the present invention is to provide an inexpensive method and apparatus for lining a pipe line; and A still further object of the present invention is to provide an effective method and apparatus for lining a pipe line by combining the steps of evagination and internally heating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Pursuant to the present invention the above disadvantages can be eliminated and the objects of the present invention can be achieved by treating a tubular lining material which has been applied to the inner surface of a pipe line with a heated gaseous medium, for example pressurized steam, which is ejected through pores, including micropores, which are formed in a tube which is introduced into the interior of the pipe line. The heated gaseous medium functions to uniformily accelerate the curing of a resinous binder material used to attach the tubular lining material to the inner surface of the pipe line, thereby shortening the time required for the completion of the lining treatment.

The method and apparatus for uniformily accelerating the curing of the resinous binder as defined by the present invention is applicable to any method which might be used for lining a pipe line with a tubular lining material but is particularly applicable to the lining method and apparatus of U.S. patent application Ser. No. 107,870 wherein the present curing method is combined with the evagination system disclosed therein. FIGS. 3 to 6 of the present application also show the evagination method and apparatus for lining pipe lines combined with the curing method and apparatus of the present invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
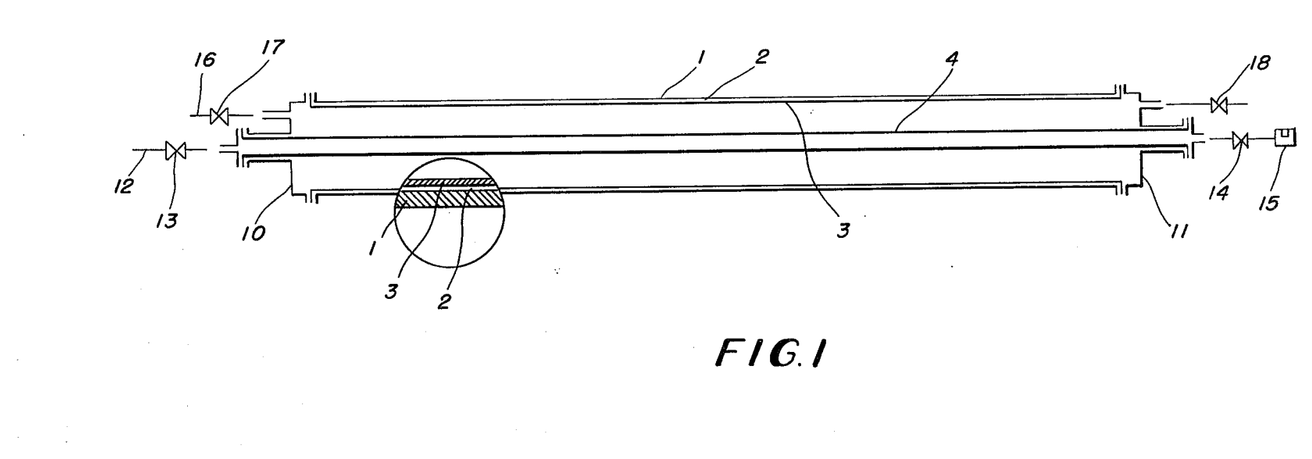
FIG. 1 shows a lining material adhered to the inner surface of the pipe line with a microporous heating tube or hose extending through the pipe line.
Figure 2:
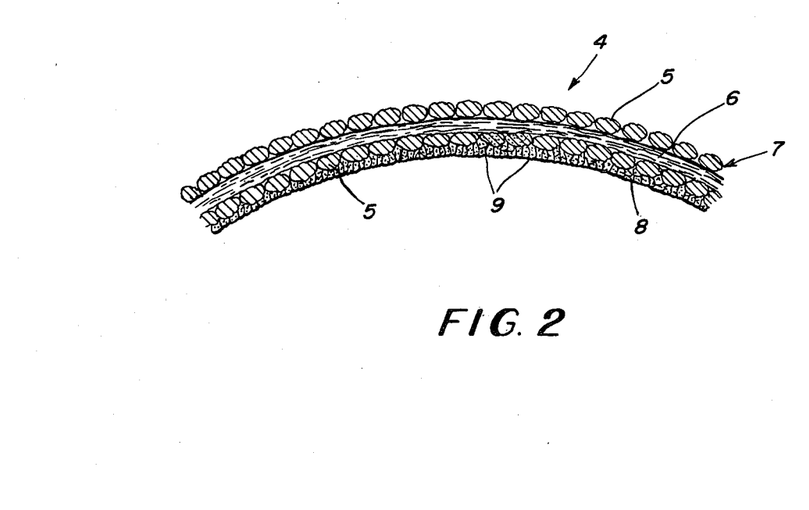
FIG. 2 is a cross-section of the microporous heating hose.

The present invention is described hereunder in conjunction with the accompanying drawings. FIG. 1 shows one embodiment of the present invention, in which a lining material 3 is firmly adhered to the inner surface of a pipe line 1 by means of a resinous binder 2. A porous or microporous hose or tube 4 is inserted inside the lining material 3 over its entire length. The hose 4 consists of a textile jacket 7 woven with warps 5 and wefts 6 into the form of a tube and provided with a lining 8 on its inner surface, as shown in FIG. 2. Minute leaking holes 9 are provided in the lining 8. Both ends of the hose are blocked except for a small hole on each end which is provided for the introducing and discharging of steam. Both ends of the pipe line are likewise closed except for an inlet and an outlet means which is used for passing a gas through the interior of the pipe line. The tubular lining material is uniformly heated by projecting a small amount of a heated gas, preferably steam, from the hose or tube through the micropores whereby curing of the resinous binder is accelerated.

In order to produce the hose 4, a number of different methods can be used, for example, the jacket 7 is provided with an extremely thin lining not capable of maintaining airtightness; fluffy fibers are used for making the jacket 7 and the fluffs are made to protrude into the inner surface of the lining 8; the lining 8 itself is made of sponge; pinholes are formed in the hose by pushing needles into it after having produced an air-tight lining, and the like. Any one of these methods may be utilized as desired.

In FIG. 1, the pipe line 1 is provided with end baffles 10 and 11 at both ends thereof, with the hose 4 also being attached to said baffles at both of said ends. An inlet for pressurized steam 12 is disposed in such a way that steam under pressure can be introduced at one end of the hose 4 through a pressure regulating valve 13. The other end of the hose 4 is connected with a drain trap 15 through a valve 14. Air is introduced by way of an air inlet 16 into the interstice or space between the hose 4 and the lining material 3 through a pressure regulating valve 17. At the other end of the pipe line 1, air is liberated into the atmosphere through a valve 18.

Pressurized steam, introduced by way of the inlet 12 into the hose 4, escapes through the channels or holes 9 into the interstice between the hose 4 and the lining material 3 and warms the resinous binder 2 by the action of its latent heat transmitted through the medium of the lining material 3 to accelerate the hardening of the binder agent. According to the present invention, pressurized steam, after having filled up the hose 4 over its entire length, is discharged in a uniform manner over the entire surface of the hose 4, so that the pipe line 1 can be warmed substantially uniformly over its entire length, thereby subjecting no portions of the pipe length to overheating or insufficient warming. In addition, the use of such a hose as shown in FIG. 2 is not likely to cause the pressurized steam which is leaking out of the holes 9 in the lining 8 to be suddenly jetted, because the jacket 7, in the form of a fiber layer covering the outer surface of the hose 4 reduces the pressure of the steam so as to cause it to slowly leak out of the hose 4 through micropores, and thus the pipe line can be warmed more uniformly.

By the way, when air is introduced through the air inlet 16 into the interstice between the hose 4 and the lining material 3 simultaneously with introduction of pressurized steam into the hose 4, the steam leaking through the walls of the hose 4 is stirred by the flowing air thereby rendering the warming more uniform. Moreover, by warming the air or by providing pressurized steam in an amount of about 1–30% by weight to be included in the air, it is possible to prevent the temperature around the air inlet 16 from falling due to the action of the air and to uniformly warm the pipe line over its entire length without producing inequality in temperature.

The present invention is particularly suitable for application in a method wherein a lining material is inserted into a pipe line by being turned inside out by the action of fluid pressure and by firmly adhering the lining onto the inner surface of the pipe line.

Another method for providing the inner surface of a pipe line with a lining is known whereby one end of a lining material with a binder agent being applied to its inner surface is fixed in an annular shape in such a manner that fluid pressure can act on the rear of the annular fixed portion and then the lining material is, at the same time, turned inside out at the turned up portion which is formed in the annular fixed portion, said turned up portion being moved forward within the pipe line so that the lining material, as it is turned inside out, can be firmly secured to the inner surface of the pipe line by means of the binding agent.

This method is an advantageous one, whereby the lining operation can be completed within a short period of time and the lining material is not susceptible to being damaged or broken due to excessive force being applied thereonto. One embodiment of the present invention is hereinunder described in conjunction with the accompanying drawings.

Figure 3:
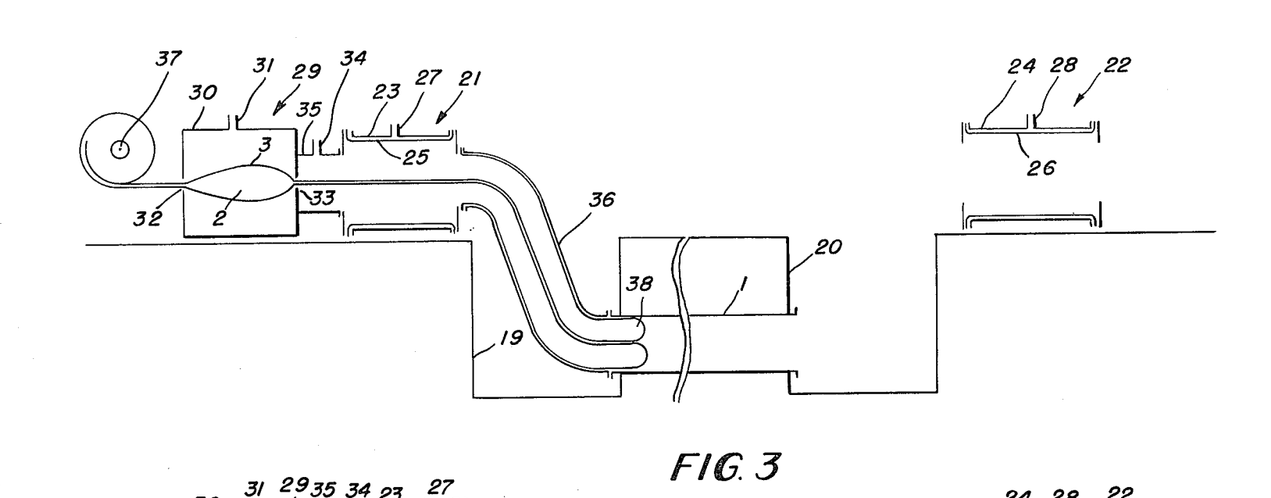
FIG. 3 shows a pipe lining material being continuously turned inside out by action of fluid pressure.
Figure 4:
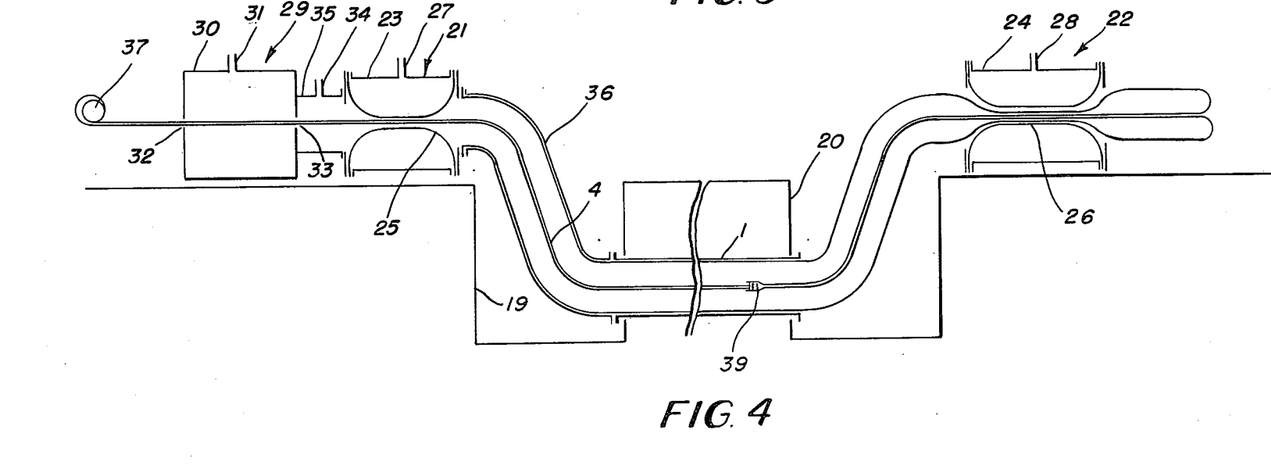
FIGS. 4 to 6 show a method and apparatus for sealing the pipe lining material at the end portions thereof.

FIGS. 3-6 show the method of lining pipe lines and introducing a microporous tube into the interior of a pipe line. As seen in FIG. 4, a microporous tube 4 having a length at least equal to that of the pipe line is connected at a joint portion 39 to the rear end of a relatively short rope and introduced into the interior of the pipe line as evagination of the tubular lining material proceeds in the same manner as described in application Ser. No. 107,870. After completion of the curing of the resinous binder, the microporous tube and the incidental accessories are taken out from the pipe line.

In FIG. 3, excavated working holes 19 and 20 are disposed at both ends of pipe line 1, which opens into said working holes 19 and 20, respectively. Squeezing devices 21 and 22 which are provided with flexible tubes 25 and 26 are inserted into pope bodies 23 and 24, respectively, and both ends of the said tubes 25 and 26 are fixed in an annular shape at both ends of the respective pipe bodies 23 and 24. By introducing a pressurized fluid such as compressed air, etc. into the interstice between the pipe bodies 23 and 24 and the tubes 25 and 26 through the inlets 27 and 28 for introducing a pressurized fluid mounted on the said pipe bodies 23 and 24, the tubes 25 and 26 are expanded by internal pressure to close up the conduit area defined by the pipe bodies.

A pressure container 29 is set up at the rear end portion of the squeezing device 21, and an inlet 31 for introducing a pressurized fluid is provided with on a cylindrical drum 30. The cylindrical drum is provided with apertures 32 and 33 on both sides thereof. A connecting cylinder 35 is mounted on the front end of the cylindrical drum 30, and the front end of the connecting cylinder 35 is attached to the squeezing device 21. The front end of the squeezing device 21 is connected with one end of the pipe line 1 through a flexible leading tube or induction pipe 36.

The lining material 3 is of a fairly larger length than that of the pipe line 1, and one end of the lining material 3 is connected with one end of the hose 4 of approximately the same length as that of the lining material 3, the hose 4 and the lining material 3 being rolled from another end of the former on a reel 37.

The lining material 3, drawn out of the reel 37, passes through the apertures 32 and 33 to be fixed in an annular shape between the squeezing device 21 and the leaking tube 36. At this time, the binder 2 is enclosed in the portion of the lining material 3 which still remains between the apertures 32 and 33. The binder may be applied, in advance, onto the inner surface of the lining material 3 over its entire length.

In this state, a pressurized fluid such as compressed air, etc. is introduced through inlets 31 and 34. This causes fluid pressure to act on the rear of the annular fixed portions so that the lining material 3 is turned inside out to form the turnup or reversed portion 38. In the next step, the lining material 3 is continuously turned inside out by the turned up end portion 38, which is eventually brought to the pipe line 1 and pushed forward in the interior of the pipe line 1. The lining material 3, which has been rolled on the reel 37, is continuously drawn from the reel by this evaginated motion to make its way into the pressure container 29 through the aperture 32. The binder 2 which is applied thereto with the amount to be applied being regulated by the aperture 33, proceeds into the pipe line 1 through the leading tube 36 and reaches the turned up portion 38 where the lining material is turned inside out. Then, the lining material 3 is firmly attached to the inner surface of the pipe line 1 by the action of the said pressurized fluid. It is this situation which is represented in FIG. 3. Although FIG. 3 shows the lining material 3 being continuously turned inside out by the action of fluid pressure, a string-like long element may be inserted, in advance, into the lining material 3 which can then be turned inside out by pulling the long element through the interior of the pipe line 1.

Thus, evagination of the lining material 3 progresses as the turned up portion 38 is pushed forward along the pipe line 1. About one half of the full length of the lining material 3 is turned inside out as its free end is pulled into the pipe line 1 by way of the pressure container 29. When the turned up portion 38 of the lining material 3 comes out of the other end of the pipe line 1 as a result of further evagination, the turned up portion 38 is led upward and removed from the working hole 20 and made to pass through the squeezing device 22 for stopping the evagination. In this case, since the lining material is sufficiently longer than the pipe line 1, the coupling 39 between the lining material 3 and the hose 4 still remains in the pipe line 1.

Figure 5:
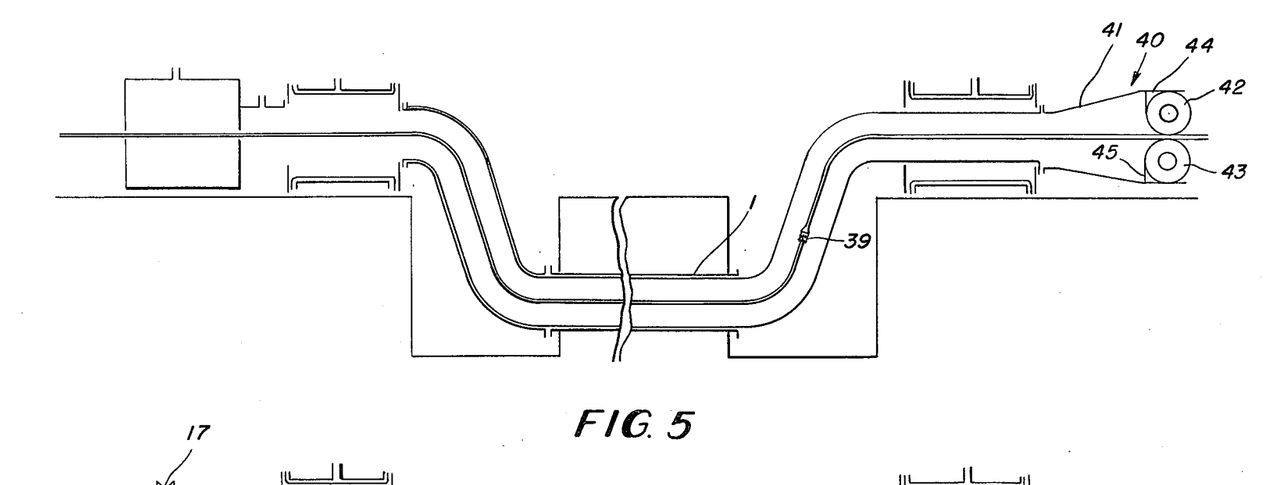

Then, upon introduction of a pressurized fluid such as compressed air, etc. by way of the pressurized fluid inlets 27 and 28 of the squeezing devices 21 and 22, the tubes 25 and 26 are expanded by internal pressure to squeeze the lining material 3, as shown in FIG. 4, whereby the fluid pressure inside the lining material 3 can be maintained. The turned up portion of the lining material 3 which extends beyond the squeezing device 22 is then cut open and, at the same time, a sealing device 40 is set up at the end of the squeezing device 22 as shown in FIG. 5. This sealing device, having a circular section on the rear end and a rectangular one on the front end, carries a pair of nip rollers 42 and 43 freely rotating on the tip of a drum 41 which is more expanded at the tip than at the rear end thereof. Rubber-like elastic plates 44 and 45 are fixed on the upper and lower inner surfaces of the drum 41 and are placed into contact with the peripheral surfaces of the nip rollers 42 and 43 in such a manner so as to prevent any leakage of the pressurized fluid from the front end of the sealing device 40. The tip of the lining material 3 already turned inside out in the cut open portion of the lining material 3 is fixed in an annular shape between the squeezing device 22 and the sealing device 40, and the tip of the lining material 3 which has not yet been turned inside out is pulled out between the nip of the rollers 42 and 43 toward the front of the sealing device 40.

As shown in FIG. 5, introduction of the pressurized fluid into the squeezing devices 21 and 22 is then interrupted to open them, and the coupling 39 between the lining material 3 and the hose 4 is pulled out from between the nip rollers 42 and 43 by pulling the lining material 3, not yet turned inside out, toward the front of the device. By this operation, the hose 4 can be inserted through the whole course from the pressure container 29 up to the sealing device 40.

Figure 6:
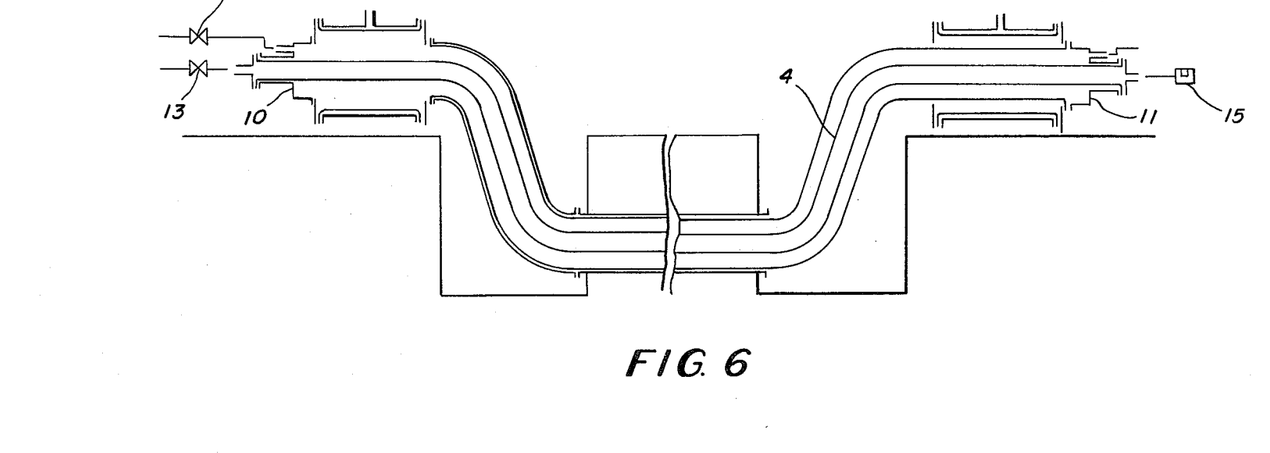

Then, the pressurized fluid is again introduced into the squeezing devices 21 and 22 to compress the lining material and to block the pipe line, fluid pressure being thus maintained at the same time in the interior of the lining material 3 inserted through the pipe line 1. This operation having been completed, the pressure container 29 and the sealing device 40 are removed from the squeezing devices 21 and 22, and, as shown in FIG. 6, the end baffles 10 and 11 are attached to the squeezing devices 21 and 22, which are then opened up again. In this state, pressurized steam is introduced into the hose 4 in accordance with the method previously described, and the steam is formed to leak out of the hose 4 which warms the adhesive agent 2 through the medium of the lining material 3, thereby hardening it, whereby the lining material 3 is firmly attached to the inner surface of the pipe line 1.

According to this process, it is possible to insert the hose 4 throughout the lining material 3 simultaneously with the insertion of the lining material 3 through the pipe line 1. Thus no special operation is needed for inserting the hose 4. In addition, as fluid pressure continues to act on the interior surface of the lining material 3 inserted through the pipe line 1 during the entire operation and the lining material 3 always remains firmly attached to the inner surface of the pipe line 1, the lining material 3 will never unexpectedly come off the inner surface of the pipe line 1 and no air will enter between the lining material 3 and the inner surface of the pipe line 1 which could cause defects in adhesion between the pipe line and the lining. Thus the objects of the present invention are advantageously obtained.

The following example is given herein as being exemplary of the present invention and accordingly should not be considered as limiting the scope thereof.

EXAMPLE

A ductile iron pipe with an inside diameter of 150 mm and a length of 200 m was installed, and a lining material about 2 mm thick was adhesively fixed to the inner surface of the pipe, which was then covered with sand in a thickness of about 10 cm. Then sheet-shaped thermocouples were inserted between the pipe and the lining material along the pipe system at intervals of about 20 m to enable the temperatures at these locations to be measured. The temperatures prior to the experiment was determined to be 15±2° C. on every location.

Next a hose containing pores disposed therein was inserted through the pipe. Pressurized steam at a gauge pressure of 1.5 kg/cm$^2$ was introduced into the hose at a flow rate of about 200 kg/hr. At the same time, air at a gauge pressure of 0.7 kg/cm$^2$ was passed through the area between the hose and the pipe for 30 minutes at a rate of 150 m$^3$/hr. Temperatures at the different locations were noted and recorded as curve A shown in FIG. 7.

Figure 7:
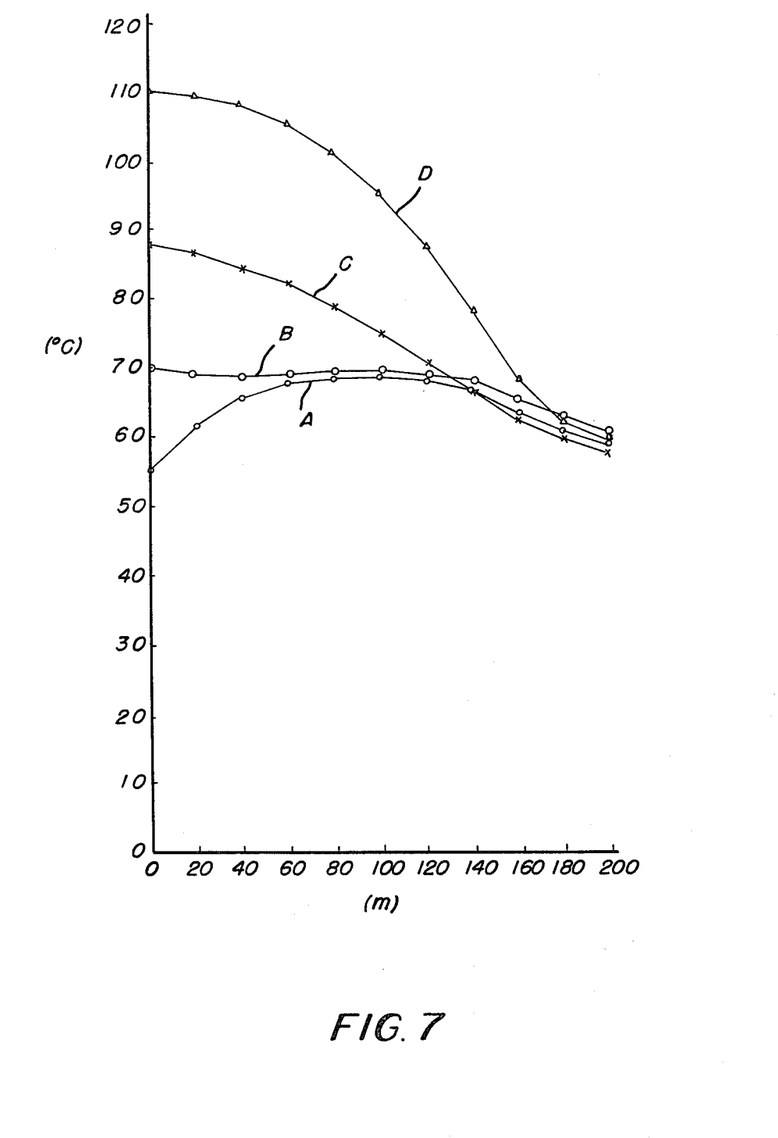
FIG. 7 shows the temperature distribution along the pipe line for several different pipe lining methods.

The temperature distribution obtained in the same manner as above in the case in which about 15% by weight of pressurized steam was mixed with air, is shown by curve B in FIG. 7.

By making hot water at 90° C. pass through the pipe for 30 minutes at a rate of 170 liters/min, a temperature distribution could be obtained as shown by the curve C in FIG. 7 as a basis for comparison. On the other hand, when a heating medium composed of a mixture of pressurized steam at a gauge pressure of 1.5 kg/cm$^2$ and a flow rate of 300 kg/hr and air at a gauge pressure of 0.7 kg/cm$^2$ and a flow rate of 150 m$^3$/hr was made to pass through the pipe for 1 hour, as another comparative example, the temperature distribution as shown by curve D in FIG. 7 was obtained.

It is understood from an examination of the results shown in FIG. 7 that, whereas the temperature in the neighborhood of the inlet of the pipe was somewhat lowered by the air current in the case of curve A, an optimum temperature range of 60°–70° C. was maintained along the remainder of the pipe line. In the case of curve B, the temperature at the end on the inlet side of the pipe was prevented from falling due to the presence of the steam in the air so that an approximate equal temperature gradient was maintained over the entire length of the pipe. Although in the cases of curves A and B, the temperature tended to be somewhat lower at the end of the pipe, a difference in temperature of such a degree produces little problem in actual operation. However, measurement of the temperature at the end of the pipe is advantageous for being informed of the lowest temperature over the entire pipe line, the temperature distribution along the pipe line and the duration of the heating, which is very convenient to know. On the other hand, in case of the curve C which shows a high temperature near 90° C. on the linet side of the pipe, the temperature is obviously too high. Furthermore, in this case, a large quantity of warm water remained in the pipe and had to be drained.

The curve D indicates a temperature, which at 100° C. on the inlet side of the pipe is so extraordinarily high that a part of the lining material was found to be deteriorated. It appears that curtailment of the duration of the introduction of pressurized steam could mitigate this problem to a certain extent, but, in that case, the temperature at the other end of the pipe could not be sufficiently raised.

It is evident from these findings that the pipe line can be uniformily warmed at an adequate temperature over its entire length by following the teachings of the present invention. Also, the pressure of the pressurized steam inside the hose is maintained approximately constant over its entire length with no reduction in pressure being noted due to leakage. Consequently, it is therefore possible to harden the binder quickly and, at the same time accomplish the lining operation of the pipe within a short period of time without giving rise to any deterioration in the lining material and the binder due to heat.

By the way, while the example was conducted on a pipe which has already been provided with a lining on its inner surface, needless to say the process is also applicable to the lining operation.

The lining material 3 which is used in the present invention is flexible and impervious and in the form of a tube. The lining material should be so flexible that it can very easily be folded in flattened state and expanded to a cylindrical form by application of internal pressure. As base materials for the lining material, natural rubber, polychloroprene, styrene-butadiene rubber, nitrile rubber, ethylene-propylene rubber, butyl rubber and the like synthetic rubbers, polyamide, polyurethane, polyolefin, polyvinyl chloride, elastomers of polyester resins and other synthetic resins can be used. Utilizable as the flexible tubular lining material for the present invention is, for example, a flexible tubular material manufactured by bonding a coating of such base material integrally onto the outer periphery of a tubular textile jacket made of a natural fiber such as cotton or hemp, a fiber of a synthetic resin such as polyvinyl alcohol, rayon, polyamide, polyester or polyether, or an inorganic fiber such as glass fiber or carbonaceous fiber, woven or knitted in a tubular form. A tubular textile jacket made of a synthetic fiber of polyester series knitted in a tubular form which has been coated on its outer surface with a polyester elastomer is especially preferable as a lining material for pipes. The polyester elastomer is a block copolymer of an aromatic polyester and an aliphatic polyetherdiol and is regarded as a thermoplastic synthetic resin which is flexible and gas-impervious and is excellent in rubbery elasticity, moldability, heat-resistance, weather-resistance, water-resistance, oil-resistance, chemicals-resistance and abrasion-resistance. This elastomer is suitable as a base material for the lining material, because of its high tensile strength and tear strength and its good adhesion to synthetic fibers of polyester series. This elastomer is commercially available under the registered trademarks "Hytrel" (DuPont, U.S.A.) and "Pelprene" (Toyobo, Japan).

The binder which is used over a board area to bond the lining material 3 onto the inner periphery of the pipe 1, should preferably be non-volatile, or in other words, should preferably be free of any volatile matter such as a solvent or moisture. Thus, the use of a non-solvent type binder which is self-curable at ordinary temperature or curable merely by heating is desirable in the present invention. Illustrative of the preferable binders are, for example, those of the epoxy type, the acrylic type and the polyester type resins. The liquid resinous binder into which micro-capsules containing a curing agent or curing accelerator have been dispersed can also be used effectively. Any of the binders can be used in the present invention according to the intended purpose. The quantity of the binder to be charged into the lining material is easily determined taking into consideration the amount of the binder to be applied to the lining material of a unit length and the full length of the lining material 3 to be applied onto the inner surface of a pipe 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for providing the inner surface of a pipe line with a flexible tubular lining material, said lining material containing a binder material on the internal surface thereof which comprises, fixing the annular portions of one end of the flexible tubular lining material, at a position in advance of the pipe line, applying fluid pressure to the rear of the annularly fixed portion of the flexible tubular lining material causing the flexible tubular lining material to be turned inside out at a turning point formed in the tubular lining material, continuing to apply fluid pressure to the flexible tubular lining material causing the turning point to advance within the pipe line, said fluid pressure also pushing the evanginated tubular lining material against the inner surface of the pipe line, to which it is firmly attached to the aid of the binder material, providing a flexible hose attached directly or indirectly to the end of the flexible tubular lining material, said flexible hose having a porous structure and a diameter smaller than that of the flexible lining material whereby, upon the continual evagination of the tubular lining material, the flexible hose is drawn into the interior of the pipe line, and introducing a heated gaseous fluid stream in the form of pressurized steam into the interior of said flexible hose whereby the heated gaseous fluid stream is introduced through the pores of the flexible hose along the inner surface of the pipe line, the flexible tubular lining material being warmed so as to accelerate the curing of the binder interposed between the inner surface of the pipe line and the flexible lining material.

2. The method of claim 1 wherein the binder is applied to the inner surface of the flexible lining material prior to evagination.

3. The method of claim 1 wherein the flexible lining material has a length longer than that of the pipe line and the flexible hose material has a length substantially equal to that of the flexible lining material whereby after the flexible lining material and flexible hose material are installed, the end portions thereof are cut free and blocked while maintaining the fluid pressure in the interior of the lining material.

4. The method of claim 3 wherein the blocked end portions are removed and the flexible lining material not yet turned inside out is removed from the pipe line.

5. The method of claim 1 wherein the flexible hose comprises a textile jacket provided with an inner lining, said inner lining containing a plurality of apertures.

6. The method of claim 1 wherein an annular channel exists between the flexible hose material and the flexible tubular lining material attached to the inside surface of the pipe line, and air is introduced into said annular channel.

7. The method of claim 6 wherein the air is heated air.

8. The method of claim 6 wherein the air contains about 1 to 30% by weight of pressurized steam.

9. A method for causing a flexible tubular lining material to be fixed to the inner surface of a pipe line wherein the tubular lining material is initially attached to the inner surface of the pipe line by a binder provided on the surface of the tubular lining material which comprises providing a flexible hose material having a porous structure, said hose comprising a textile jacket provided with an inner lining, said inner lining containing a plurality of apertures, providing said flexible hose material having a porous structure inside the pipe line which has been lined with the tubular lining material and introducing pressurized steam into the interior of said flexible hose whereby said steam is introduced through the pores of said flexible hose along the inner surface of the lined pipe line, said flexible tubular lining material being warmed to accelerate the curing of the binder interposed between the inner surface of said pipe line and said flexible lining material.

10. The method of claim 9 wherein an annular channel exists between the flexible hose material and the flexible tubular lining material attached to the inside surface of the pipe line, and air is introduced into said annular channel.

11. The method of claim 10 wherein the air is heated air.

12. The method of claim 10 wherein the air contains about 1 to 30% by weight of pressurized steam.

13. An apparatus for providing the inner surface of a pipe line with a flexible tubular lining material, said lining material containing a binder material on the internal surface thereof which comprises,

- means for fixing the annular portions of one end of said flexible tubular lining material, at a position in advance of the pipe line,
- means for applying fluid pressure to the rear of the annularly fixed portion of said flexible tubular lining material causing the flexible tubular lining material to be turned inside out at a turning point formed in the tubular lining material, said means continuing to apply fluid pressure to the flexible tubular lining material causing the turning point to advance within the pipe line, said fluid pressure also pushing the evaginated tubular lining material against the inner surface of the pipe line, to which it is firmly attached by the aid of said binder material,
- a flexible hose means attached directly or indirectly to the end of the flexible tubular lining material, said flexible hose having a porous structure and a diameter smaller than that of the flexible lining material whereby, upon the continual evagination of the tubular lining material, said flexible hose is drawn into the interior of said pipe line, and
- means for introducing pressurized steam into the interior of said flexible hose whereby said steam is introduced through the pores of the flexible hose along the inner surface of the pipe line, the flexible tubular lining material being warmed so as to accelerate the curing of said binder material after the completion of the evagination of the flexible lining material.

14. An apparatus for causing a flexible tubular lining material to be fixed to the inner surface of a pipe line wherein said tubular lining material is initially attached to the inner surface of said pipe line by a binder provided on the surface of the tubular lining material which comprises

- a flexible hose material having a porous structure, said hose comprising a textile jacket provided with an inner lining, said inner lining containing a plurality of apertures,
- said flexible hose material having a porous structure disposed inside said pipe line which has been lined with the tubular lining material and
- means for introducing a heated gaseous fluid stream comprising pressurized steam into the interior of said flexible hose whereby said steam is introduced through the pores of the flexible hose along the inner surface of the lined pipe line, the flexible tubular lining material being warmed so as to accelerate the curing of the binder interposed between the inner surface of said pipe line and said flexible lining material.

* * * * *